United States Patent [19]

Jaenisch

[11] Patent Number: 5,732,158
[45] Date of Patent: Mar. 24, 1998

[54] FRACTAL DIMENSION ANALYZER AND FORECASTER

[75] Inventor: Holger M. Jaenisch, Madison, Ala.

[73] Assignee: Tec-Masters, Inc., Huntsville, Ala.

[21] Appl. No.: 344,742

[22] Filed: Nov. 23, 1994

[51] Int. Cl.$^6$ .............................. G06K 9/36; G06K 9/46
[52] U.S. Cl. .................. 382/249; 382/128; 382/254; 358/464; 359/36; 364/413.13
[58] Field of Search ................ 382/128, 249; 358/464; 359/36; 364/413.13

[56] References Cited

U.S. PATENT DOCUMENTS

| | | | |
|---|---|---|---|
| 4,789,933 | 12/1988 | Chen et al. | 382/128 |
| 4,882,629 | 11/1989 | Faulkerson et al. | 358/464 |
| 5,065,447 | 11/1991 | Barnsley et al. | 382/249 |
| 5,076,662 | 12/1991 | Shih et al. | 359/36 |
| 5,418,714 | 5/1995 | Sarver | 364/413.13 |

OTHER PUBLICATIONS

"Fractal Interpolation For Patching Holes In Data Sets." Jaenisch, H.M., Oct. 22–23, 1992.
"A Robust Method For Chaotic Data Set Analysis Using the Semi–Classical K–Factor." Taylor, Jaenisch H.M., Oct. 1992.
"Roseta: Analysis and Applications." Barnes, Jaenisch H.M., Bass, Oct. 1992.
"Chaos and Fractal Algorithms Applied To Signal Processing and Analysis." Jaenisch, H.M., Apr. 1993.
"Radiometric Discrimination Using Holographics and Chaos Theory." Jaenisch H.M., Apr. 8, 1992.
"Chaos and Fractals in Simulation I and II." Jaenisch H.M., Oct. 18–19, 1993.
"Determining The Fractal Dimension of Scewes and Digital Signals Using Roseta and Other Novel Approaches." Apr. 13, 1993.
"Hurst's Rescaled Range Analysis Applied To Signal Processing of Periodic Data." R.L. Hershberger and L. Shepard, Oct. 13, 1992.
"Radiometric Discrimination Using Holorgraphics and Chaos Theory". Jaenisch H.M., Mar. 30, 1992.
"Practical Application of Chaos and Fractal Theory To Post–Boost Vehicle Tracking $\alpha$ Discrimination Using Active $\alpha$ Correlated Passive Sensors (U)" —Oct. 5, 1992.
"Entropy Fractal Analysis of Medical Images Using Roseta." #2132B–33, Jan. 25, 1994.

Primary Examiner—Leo Boudreau
Assistant Examiner—Daniel G. Mariam

[57] ABSTRACT

A system for generating deciphering symbols or roots and particularly to systems employing fractal metric characterizations, which in turn are based upon fractal dimensions of less than the whole of the data to be characterized.

32 Claims, 10 Drawing Sheets

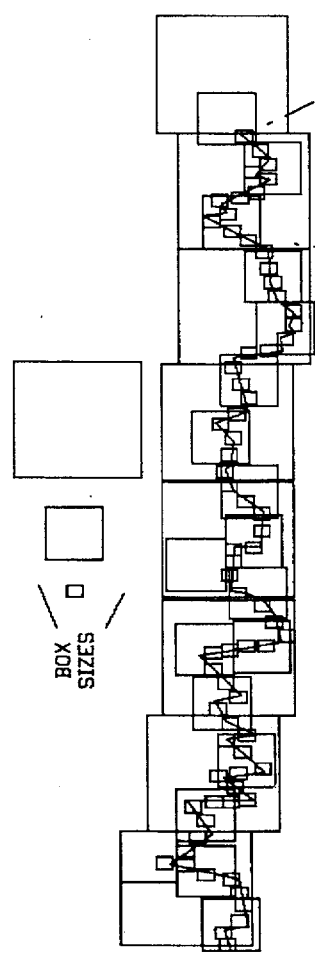
FIG. 1c
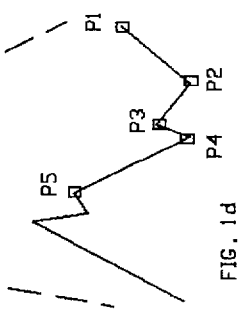
FIG. 1d
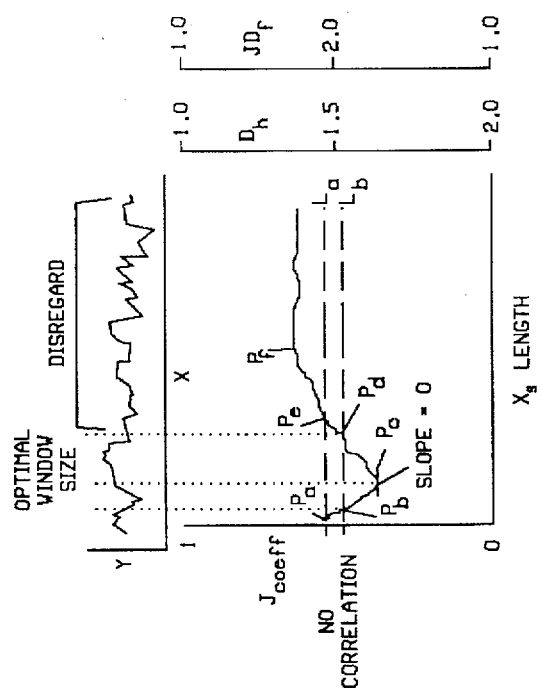
FIG. 1f
FIG. 1e

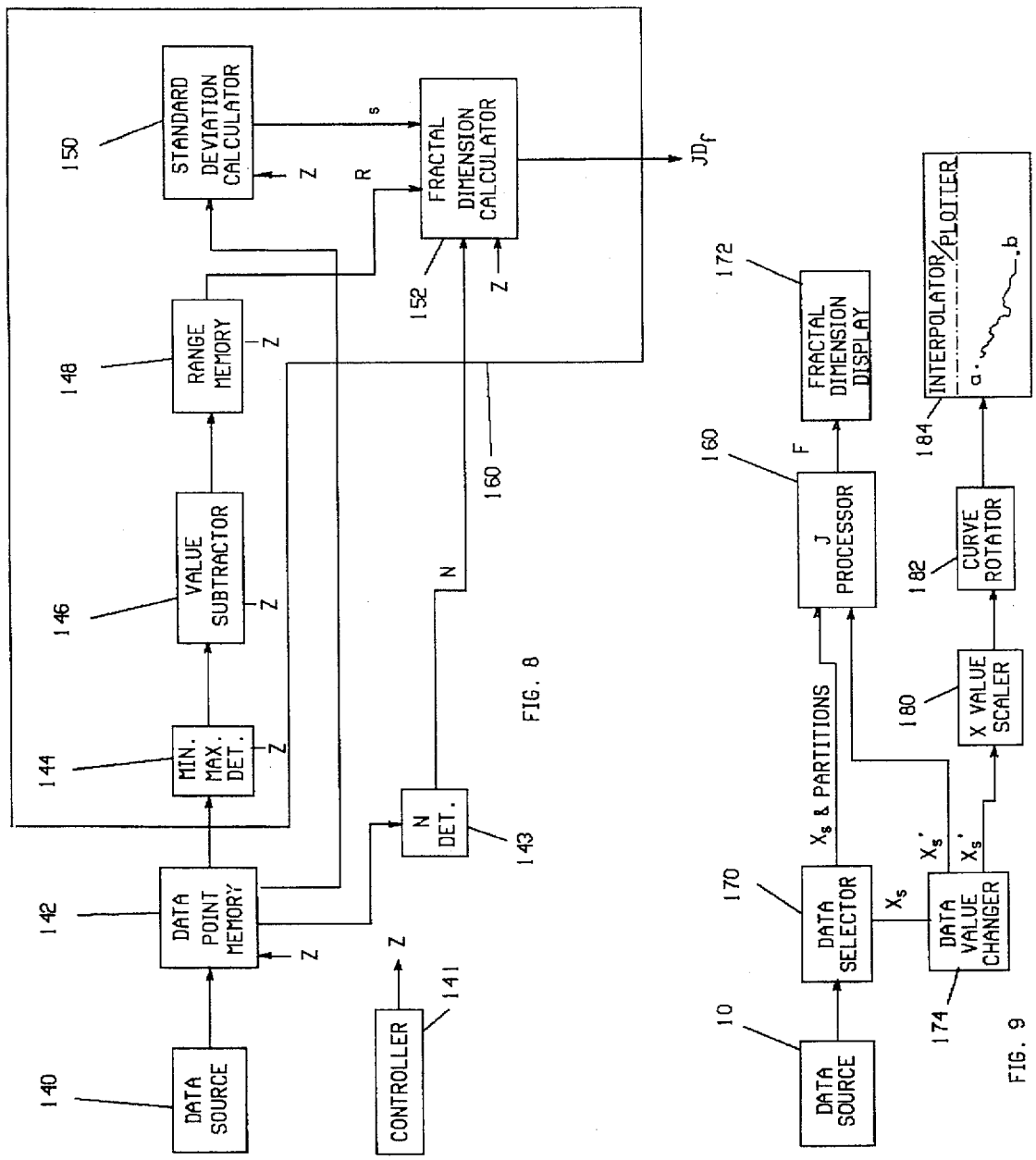

FRACTAL DIMENSION ANALYZER AND FORECASTER

FIELD OF THE INVENTION

This invention relates generally to the art of generating deciphering symbols or roots and particularly to systems employing a fractal metric characterization for this purpose.

BACKGROUND OF INVENTION

It has long been desirable to estimate from historical data of an observed activity (1) details of the activity not expressly set forth in the data and (2) the course of the activity in the future.

The first of these has taken on great importance in the past few years with (1) the demand in the computer world to abbreviate data for storage and (2) the demand made by the designers of improved definition television wherein one can transform received compressed data representations of an image back to its near original image quality.

In both applications, it obviously becomes necessary to predict from abbreviated detail further detail. The problems to be solved are broadly (1) achieving maximum accuracy of prediction and (2) achieving (1) with acceptable speed, taking into account the use involved, and particularly the uses described above.

At this time, and to the knowledge of the applicant, perhaps the best tool for many applications is known as JPEG (Joint Photographic Experts Group), and it involves the use of a discrete cosine transform for data compression. In use, there would first be effected a compression of data, which might be that of a television image which then is transmitted, after which in a television receiver there would be effected an expansion of the compressed data and reproduction of the image represented by the data. The JPEG system is clearly a good one. However, some difficulties with it are apparent. For example, the compression stage employs a system of signal truncation which results in a signal ringing and artifact production in the later process of expansion, prior to its exhibition. Further, it appears that the system is, in some applications, significantly slow.

A second and perhaps promising tool for predictive data analysis involves fractal dimensioning, particularly as applied in general to graphical exhibitable intelligence. It is inherently a faster approach, but as of this time, it does not appear to have been developed to have achieved either desirable speeds or sufficient accuracy.

A "fractal dimension," while difficult to precisely define, is recognized as being present in, for example, many "thing" or condition-oriented activities and is one which, if well determined, can be very useful in the prediction of related but otherwise unknown activity be it concurrent or perspective. To provide some feel for a meaning of this term, the expressions "texture" and "extent of complexity" may be thought of as illustrative. As to its determination, the following is believed as exemplary of prior art approaches:

(A) Data would be available of a measurable activity.

(B) This data would be plotted as a curve or image in terms of, for example, rectangular coordinates, the curve having a dimensionally located beginning and end.

(C) An arbitrary size of rectangular box is chosen for positioning over one increment of the curve, and like size boxes are positioned beside it of such number to encompass the whole curve. Thus, we now have the box size, which we will label "B" and the number of boxes required, which we will label "N." The logarithm of each is taken, and the ratio of log "1/B" to log "N" is computed as a first point on a log-log graph.

The process is repeated several times by varying, as by decreasing, the size of boxes and finding new numbers required to encompass the curve, whereby a series of computed log ratio points are obtained.

Finally, the values of the log ratio points are plotted as a curve, or image, and a straight line is calculated, or constructed, to approximate its configuration. Its slope is taken as the fractal dimension of the activity as shown in FIG. 1f.

Generally, it has been thought, and practice has been in accord with, that a fractal dimension must be obtained from the maximum available history of an activity. Applicant has discovered to the contrary.

Further, applicant believes that this maximum history approach may account for uncertainty of relation between a record, e.g., a data sequence, representative of an activity, and a fractal dimension as conventionally determined from it. The status of this relationship has been described in the periodical *Fractals in the Physical Sciences*, John Wiley, page 145 (1989), which states in part:

"The fractal dimension is a generic name for dimensions which can take fractional values. These include the Hausdorf dimension $D_H$, the capacity dimension $D_C$, and information dimension $D_I$. For some fractals such as the De Wijs fractal, these dimensions do not coincide."

The applicant subscribes to this conclusion following very substantial work in the field.

As an example of ongoing work, U.S. Pat. No. 5,065,447 very comprehensively references the state of the art relating to fractal sets, and which is incorporated herein by reference. It discloses a system wherein fractal analysis, termed "fractal transforms," is performed. It (1) divides an image into portions and (2) shrinks the image and effects frequent comparisons between (1) and (2). Unfortunately, however, the results are not dimensions of data, but rather shrunken images and are in no way illustrative of methods for predicting or projecting future events or behavior of the data set from which they were derived. Rather, the reduced images are thus descendent from the whole of the image and remain copies of the overall original image as a whole, only in reduced scale. Thus, it, too, appears to be based upon the proposition that more data must be best, with which the applicant disagrees. Finally, it appears that while the patented system is a very comprehensive one, it is believed to provide only a marginal improvement over the JPEG approach, and its practice appears to be quite time-consuming absent the construction of special dedicated hardware.

In any event, applicant believes that the state of the prior art is such as to leave much work to be done in the process of determining fractal dimensions if their useful relation to the data upon which they are based is to be enhanced.

Accordingly, it is the object of this invention to provide via new manipulative systems of fractal analysis a discernable improvement in the certainty of association between a sequence of data and a fractal dimension determined of it and thus its value.

It is a further object of this invention to provide improved systems for employing such fractal dimensions in the processing of, or extrapolation and interpolation of data.

SUMMARY OF THE INVENTION

In accordance with a feature of this invention, the applicant has developed a system for fractal dimensioning wherein a full sequence of signals directly of a discrete historical activity is separated, or reduced, into one or more groups, either by division or by other selection. Then, fractal metrics are directly obtained for certain of the groups which enable optimal historical data window sizes to be determined facilitating robust forecasting. The applicant has provided a system which detects when a sequence may render significant fractal dimensions.

As still a further feature of this invention, the selection of a data group is effected when the slope or change of a series of fractal dimensions is approximately zero.

It is a still further feature of this invention to provide improved systems of determining extensions to historical data, interpolation or extrapolation, in one instance employing the weighted means of the historical data and a function of the frequency distribution exhibited by a fractal dimension.

BRIEF DESCRIPTION OF THE DRAWINGS

FIGS. 1b–1f illustrate waveforms pertinent to the operation of the system shown in FIG. 1a.

FIG. 8 is an electrical block diagram wherein fractal dimensions are computed by a new system and wherein the results are particularly robust for any data sequences ranging in size from three points to a maximum dictated by available memory and storage considerations and applied length criteria.

FIG. 9 is an electrical block diagram of a system for multi-fractal interpolation.

DESCRIPTION OF THE PREFERRED EMBODIMENT

Figure 1A:
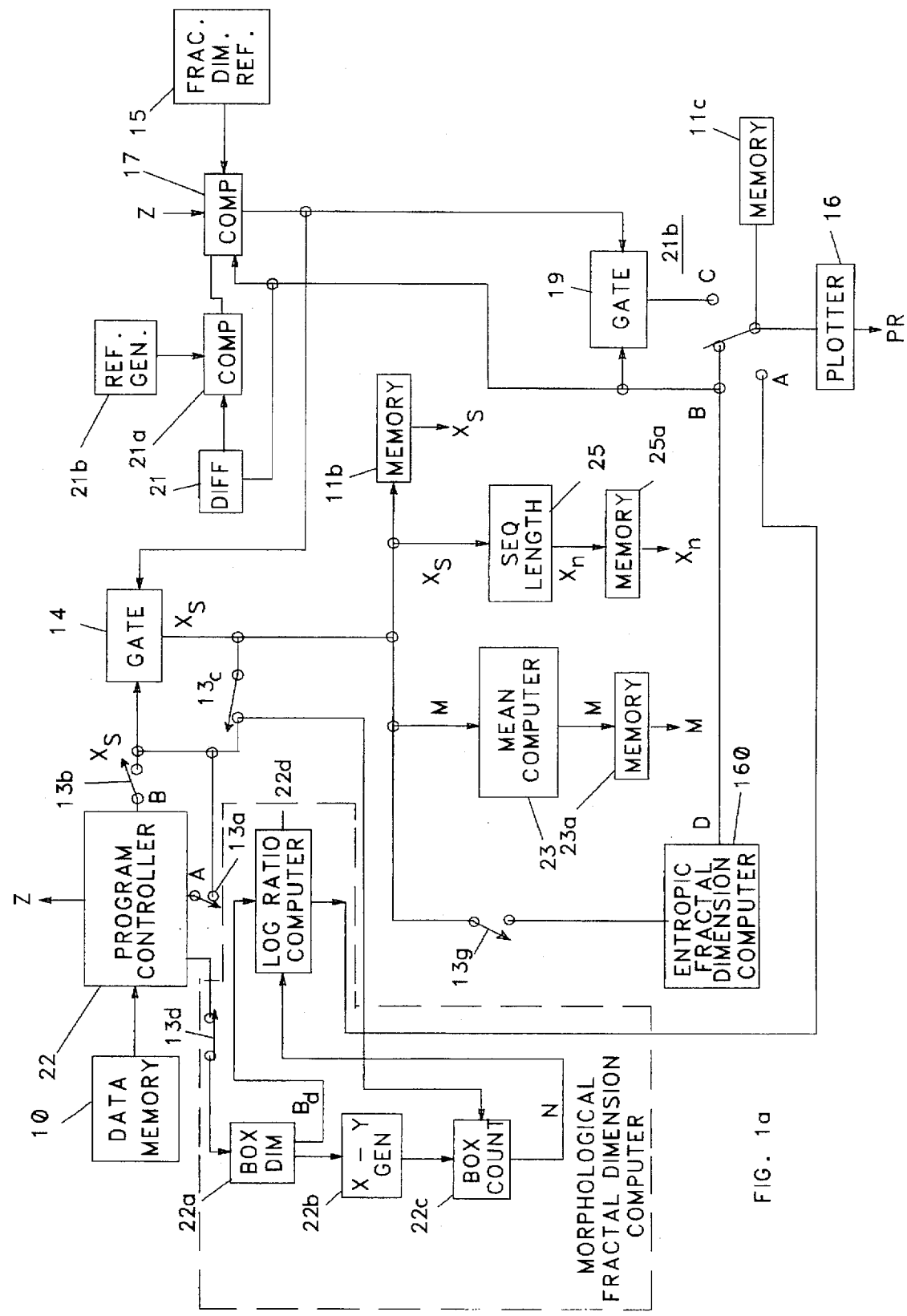
FIG. 1a shows an electrical block diagram of a system which effects two processes of determining fractal dimensions wherein each is characterized by employment of a reduced data sequence as a base.

FIG. 1a illustrates what is termed a Rosetta system or systems and discloses several embodiments of computing systems for obtaining fractal dimensions largely from pieces of the data of interest. In each case, the same total sequence of data is stored in, or discernable from, historical data memory 10, which may be a buffer memory, and is illustrated by curve L1 of FIG. 1b. As shown, curve L1 is an X-Y plot of data of a historical activity, for example, for 100 days. While not detailed, it is assumed to be in terms of one data point per day measured along the X axis and having Y values expressed in a selected scale. In this example, the X-Y scales are in terms of displayable pixels of plotter 16 wherein the smallest changes are selected to be one pixel.

Memory 10 is addressable in a conventional fashion to provide either of two orders of selection of data points of curve L1. The selection is determined by the setting of program controller 22, and for purposes of illustration, one selection is made by obtaining data from terminal A and a second selection from terminal B, this being via switch 13a or 13b as shown.

Further, FIG. 1a includes a switch arrangement consisting of switches 13c and 21b to choose between processing of all the data of L1 or only a portion of it which meets certain criteria, as will be explained. This option applies only to a data sequence provided by B.

Figure 1B:
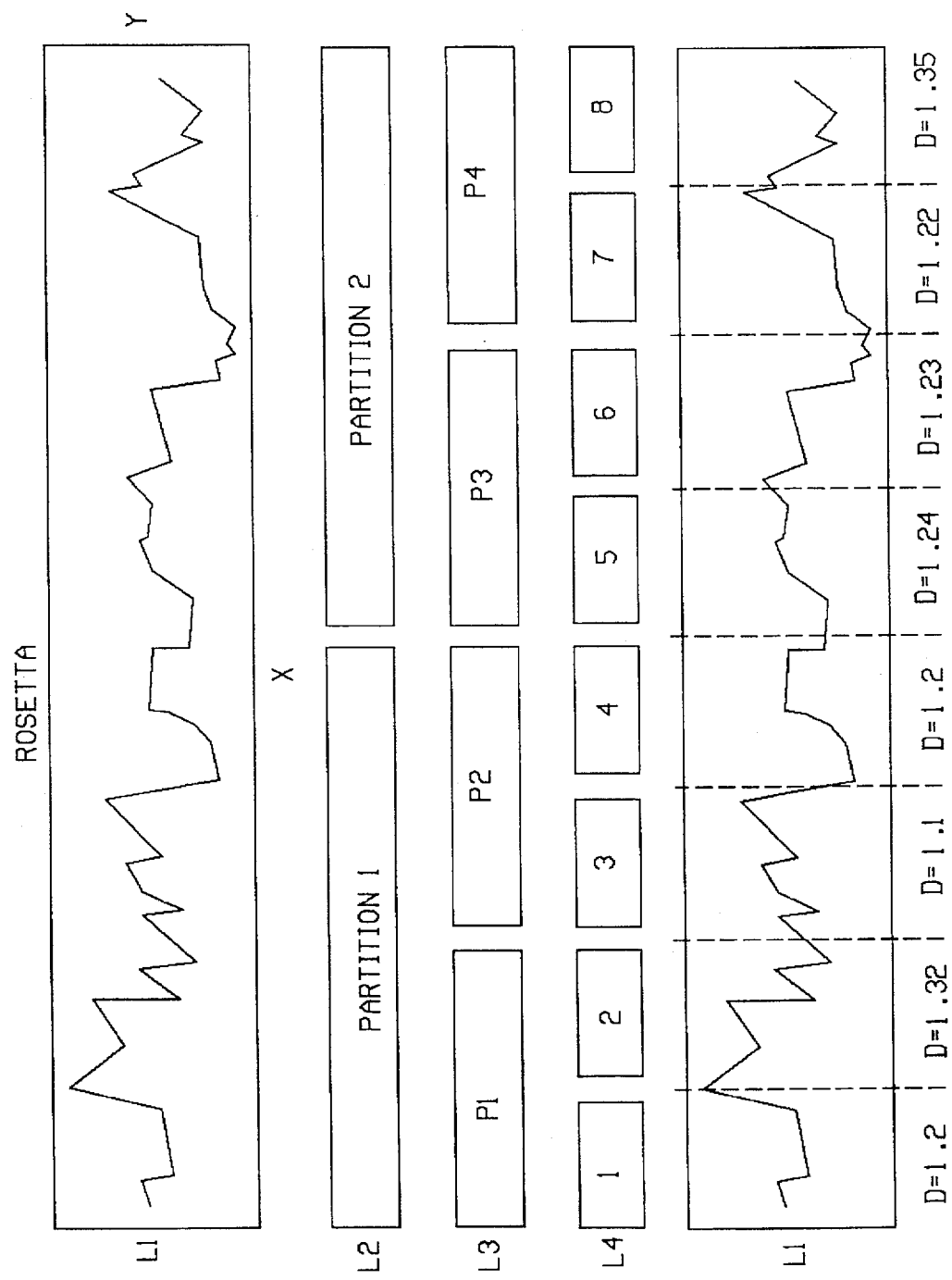

It will be assumed first that fractal dimensions are to be obtained with respect to the data, or data points, of curve L1 and in terms of discrete partitions of it as illustrated in FIG. 1b, this being from a selection A of controller 22, with switch 13a closed and switch 13b open.

It is to be first assumed that computations of fractal dimensions of each, the whole curve and the partitions, will be by the conventional method described above. Significantly, most of the fractal dimensions are from the discrete partitions or pieces of the curve, a feature of this invention.

To proceed, the switches would be in the illustrated position, and data $X_S$ is obtained from output A of controller 22 from memory 10, being the whole of data sequence L1. It is provided as one input to box counter 22c. In keeping with the conventional method, program controller 22 also instructs box size or dimension reference 22a to select and furnish an initial box size, denoted B, which would be a selected one of a group of sizes selectable by controller 22. This box size or division is fed as an input to log ratio computer 22d and as one input to X-Y box generator 22b. For example, the initial box size might have an X-Y dimension of eight pixels by eight pixels, or, for example, via a circular box having a diameter of eight pixels. The reference to pixels would be in terms of that displayable by plotter 16. An example of different size boxes are illustrated in FIG. 1c.

Box generator 22b then generates an eight-pixel-by-eight-pixel X-Y dimension box size B and supplies it as an instruction to box counter 22c.

A box size is scaled to curve L1, and then curve L1, generally labeled $X_S$, is also provided to box counter 22c. Box counter 22c then computes the number N of boxes required to cover curve L1 as illustrated in FIG. 1c. This number, or count, N is supplied to log ratio computer 22d along with the box size B as discussed above. Log ratio computer 22d then computes the logarithm of each of B and N and then takes the ratio of log N/log (1/B). This first ratio value from curve L1 is fed via contact "A" of switch 21 to plotter 16 where the value is plotted as a first point on a double logarithmic plot and to memory 11c where it is stored.

This method is repeated several times by the selection of a series of other, box sizes. Such selection may be accomplished by starting with a single box large enough to cover the entire curve L1, then by progressively reducing the box size by a factor of 2 until the log ratio distribution is no longer linear but flattens out into a plateau thereby indicating that the smallest significant portion of information in curve L1 has been extracted. The resulting series of log ratios are fed to plotter 16 and memory 11 and added to the plot. Thereafter, a straight, conformed line for the plot is drawn or computed and drawn, and the slope of this line is computed as representative of the fractal dimension for curve L1 (FIG. 1b) as a whole, as further illustrated in FIG. 1f. This is termed a global fractal dimension since it was derived from the data curve L1 as being represented as a geometric "thing," the inventor further distinguishes this metric as a morphological global fractal dimension. Significantly, this fractal dimension is, at least not alone, employed by this invention to determine a new data sequence for interpolation or extrapolation, which is an object of this invention.

Thus, next, as a feature of this invention, program controller 22 extracts from memory 10 two equal partitions of curve L1, partition 1 and partition 2, as illustrated as L2 in FIG. 1b. Each of these is separately processed as described for curve L1 and log ratio values plotted and a fractal dimension determined for each from slope lines on plotter 16. Thus, each fractal dimension is discretely available as a new data sequence determining element, as selected.

Following this, curve L1 would be further subdivided to establish data partitions of P1, P2, P3, and P4, as designated by L3 of FIG. 1b, and fractal dimensions for discrete partitions are separately determined in the same manner as described above. The process would be continued with, for example, further partitions, calculations, and plottings and fractal dimensions determined as illustrated for the eight partitions of L4 of FIG. 1b. Exemplary values of fractal dimensions for the partitions of L4 are noted by the designation D on FIG. 1b. The process of determining fractal dimensions from smaller partitions may continue in the manner described until there are too few points for computation. Fractal dimensions are displayable on plotter 16 and storable in memory 11. This is in addition to the storage of log ratios as discussed. Thus, a new curve is obtainable which is a transformation of the original data $X_S$, or L1, or data set, into a time or data length fractal dimension curve D whose components consist entirely of a plurality of fractal dimensions as a function of the historical data partitions processed. This curve would be useful to preserve for reconstructing the original data contained in each respective partition.

It is to be noted that in addition to the provision of the data sequences from output A of controller 22 to box counter 22b and log ratio computer 22d, the data sequences are also supplied to memory 11b and may be stored as discrete partitions described. Further, the "mean" of a data portion is computed, averaged, by mean computer 23, and the mean stored in memory 23a.

Further, sequence length detector 25 senses the length, or the number of data points $X_N$ of a data partition, and provides a total count, which count is storable in memory 25a. These additional functions would be effected with switch 13b open where fractal dimensions are to be obtained via log computer 22d.

The arrangement of processing just described wherein a curve of data is partitioned is designated by the applicant as a global spectrum Rosetta arrangement in that it proceeds from the whole of the data. On the other hand, except for the one fractal dimension of the whole of curve L1, the fractal dimensions are "piece derived." Thus, predominantly, the results achieved are from discrete pieces, termed local fractal dimensions (in this case they are still morphological since box-counting was used to obtain their value), which is in distinct contrast with the known prior art.

Preferable to the conventional morphological method of determining fractal dimensions just described, curve L1 (or $X_S$) and/or all or selected ones of its partitions would be processed by the system shown in and as discussed with respect to FIG. 8, and in this instance, with switches 13a and 13g closed, the switch 13d open, the curve L1 and/or its partitions are supplied to entropic fractal dimension computer 160. When this is done, switch 21 would be set to the "B" position wherein the fractal dimension outputs of computer 160 would be supplied to memory 11 and plotted on plotter 16. Computer 22d is rendered inoperative, by the opening of switch 13d, as its output would not be used. Thus, computer 160 would compute an entropic fractal dimension or fractal dimensions for each data sequence of L1 and/or a partition as discussed with respect to FIG. 8. Discrete fractal dimensions would be displayed on plotter 16 as stored in memory 11. These dimensions are termed a Rosetta spectra.

Alternately, to the division of data into groups or partitions as discussed above, a different system of data extraction and processing of curve L1 is available from controller 22 at terminal B. This is termed an expanding window calculation. For this method, switch 13a is opened and switch 13b is closed. Switch 21 is set to the "B" position. Thus, under these conditions, discrete sets (FIG. 1d) of data points, or pieces of data are extricated by controller 22 from source 10.

At this point, there is illustrated a choice of systems for computing fractal dimensions. In the conventional (morphological) one, the processing would be as described earlier as box counting, except that data sets, of course, are different, and reference is made to FIG. 1d. A first data set would comprise data points $P_1$, $P_2$, and $P_3$, being the most recent data points would be provided to box counter 22c as indicative of curve length. Then, for example, with the conventional system, an initial box size B might be 1 and a box size B of 1×1 pixels, and this would be provided by box referenced 22a to box counter 22c and to log ratio computer 22d. The box count N would be made by box counter 22c and provided to log ratio computer 22d.

From these log ratios, computer 22d would determine a first log ratio as described. This would be plotted as a first point 16. Thereafter, a larger box size would be selected, a new box count obtained, and a new log ratio calculated and plotted on plotter 16. This would be repeated to the extent that new data is obtainable. When it is not, a final set of log ratios is obtained, then a straight line is drawn or computed through the plotted log ratio values, and the slope of this line would be the fractal dimension of the curve or data sequence made up of data points $P_1$, $P_2$, and $P_3$.

Next, a fractal dimension would be obtained in the same fashion from a data sequence which would consist of the first three data points $P_1$, $P_2$, and $P_3$ plus a fourth one, the next one, data point $P_4$, as shown. The process would be repeated, employing selected sets of box sizes and box numbers, and from these log ratios would be plotted and a new fractal dimension obtained as described. Following this, the process would be repeated from data curves with progressively added new data points, e.g., with point $P_5$ as shown in FIG. 1d. Thus, there would be obtained a series of fractal dimensions which may be displayed on plotter 16 and/or stored in memory 11.

A second system for determining fractal dimensions for sequences of FIG. 1d, as obtained from output B of controller 22, would be performed by entropic computer 160. To effect this change, log ratio computer 22d is rendered inoperative by the opening of switches 13d and 13a, and the B output of program controller 22 is supplied, with switches 13b and 13g closed, directly to entropic fractal dimension computer 160. The processing of data by mean computer 23 is not used.

As described with respect to the conventional processing starting with data points $P_1$, $P_2$, and $P_3$, computer 160 first calculates the fractal dimension resulting from these three points, and reference is made to the operation of the system described with respect to FIG. 8, termed the J system. Then, as described, discrete curves would be processed wherein each employed an added data point, $P_4$, etc. Although data is processed in a reverse order sequence to determine an optimal historical window size, other sequences may be substituted from curve L1 or $X_S$ for generic characterization of the data. This concept follows the applicant's significant discovery that entropic fractal dimensions are not order sensitive, rather being dependent only on the values of the data points, unlike morphological methods assumed in the teaching of prior art methods.

In any event, a new curve is obtained which is a transformation of the original data $X_S$ or data set into a time or data length varying fractal dimension curve F whose components consist entirely of a plurality of fractal dimensions as a function of the historical data window processed. Such a curve may be used to select an optimum window size of historical data for use in prediction and forecasting, particularly illustrated in FIG. 9.

Thus, alternately, and importantly, the system of FIG. 1a responds to applicant's discovery that "more data" does not necessarily provide better fractal dimensions indicative of historical data behavior. In fact, it may have an obscuring effect. Thus, there is provided circuitry for the reduction of data, under the criteria to be described whereby a discrete window size of data is employed in forecasting as suggested above. It is employed with data selections being the same, that is, from output B with switch 13a open and switch 13b closed. Further, switch 13c is opened, and switch 21 moved to the C position. Thus, the raw data $X_S$ must pass through gate 14 to entropic fractal dimension computer 160, memory 11b, mean computer 23, and sequence length detector 25. Actually, mean computer 23 may not be used. Gates 14 and 19 are normally closed, and the output from computer 160 must pass though gate 19, which establishes a window size, as will be described.

Thus, assume that data would be extracted by controller 22 from memory 10 commencing at the end point (P1) of a data sequence (as shown by FIG. 1d) and points are added in a backward direction as shown and described above for the expanding window calculation.

As discussed with respect to FIG. 8, computer 160 sequentially computes fractal dimension signals for each sequence, first from $P_1$, $P_2$, and $P_3$, one after another, as data points are added. These signals are then supplied essentially in the order computed to gate 19 where they normally are passed, but are blocked based upon a signal developed as per a discrete criteria. Gate 14 is similarly controlled.

The criteria referred to is developed as follows. Reference is made to FIG. 1e wherein there are illustrated three sets of parameters with respect to the Y axis, these being the Jaenisch coefficient $J_{coef}$ shown on the left which extends from 0 to 1, a fractal dimension referred to as $D_h$, wherein h refers to the originator (Hurst) of this dimension, and Jaenisch fractal dimension $JD_f$ as determined by the system shown in FIG. 8. As illustrated, the Y scales are 1 to 2 for $D_h$, 1 to 2, and then +1 for $JD_f$, and 0 to 1 for $J_{coef}$. The curve F which commences as shown at upper dashed line $L_a$ at point $P_a$, then descending downward through point $P_b$ at lower line $L_b$, to a point $P_c$ where it bottoms out, and thus the slope of the curve is 0 at point $P_c$. The range between dashed lines $L_a$ and $L_b$ represents a region where data contains no useful information for forecasting. From point $P_c$ to point $P_d$ where it intersects the lower dashed line $L_b$, it then extends gradually upward through point $P_e$ at upper dashed line $L_a$. It then moves generally upward until it commences to flatten out at point $P_f$.

The sequence of signals $X_S$ is generally supplied to fractal dimension computer 160, and the resulting signals represented by the curve of FIG. 1e are provided as an output as the expanding window calculated curve. This output is fed to differentiator 21 which computes the differential or slope of the fractal dimension and supplies a slope signal, as an input, to comparator 21a. A second input to the comparator, representative of zero slope, is provided by reference slope generator 21b. Comparator 21a functions to provide an enabling type signal after the differential of the fractal dimension is equal to zero.

Comparator 17 receives a signal from comparator 21a, a fractal dimension signal from computer 160, and a fractal dimension reference signal from fractal dimension reference 15. The reference signal is indicative of a fractal dimension of approximately the lower value of the lower dashed line $L_b$ of FIG. 1e. When the fractal dimension signal from fractal dimension computer 160 descends to a value equal to $L_b$ at point $P_b$, comparator 17 provides a control output to gate 14 which causes gate 14 to open the flow of data to computer 160, mean computer 23, sequence length detector 25, and memory 11b.

At the same time, the same output of comparator 17 triggers gate 19 open and enables flow of fractal dimension signals from computer 160 to plotter 16 and memory 11.

Next, with reference to comparator 21a, it will sense when the curve has reached point $P_c$ and by a zero slope provide an output to comparator 17 which enables it. Thereafter, when comparator 17 again senses a lower dashed line level signal at point $P_d$, comparator 17 provides a signal to gates 19 and 14 which blocks signal flow of data and fractal dimensions, leaving as the instructive region of the curve that extending between points $P_b$ and $P_d$.

The significance of the foregoing is that the most significant fractal dimension is in the vicinity where the slope of the curve is zero. However, the optimal windowed size of the data L1, of which the trailing portion is depicted in FIG. 1d, is identified by the fractal curve from point $P_b$ to point $P_d$, by extracting from the X axis the size of the optimal historical data window. If the window size corresponding to the X value of point PC is used, the corresponding historical data may be used to forecast both trend and magnitude. The upper region of the curve from point $P_f$ on is useful in identifying data window sizes which provide trend information only. The window identification process is illustrated in FIG. 1e in reference with the data curve L1 which appears in reverse order above the fractal curve.

By the system just described, there is determined a window of significant historical data. Thus, where the data examination commences with the last data provided, the examination and thus data obtained will go back only until a significant fractal dimension occurs under the circumstances described. Thus, it can be seen wherein only selected data is processed, thus providing a more significant data modeling plot of fractal dimensions on plotter 16 and as provided to the system described in FIG. 2 for extrapolation, or for interpolation.

Figure 2:
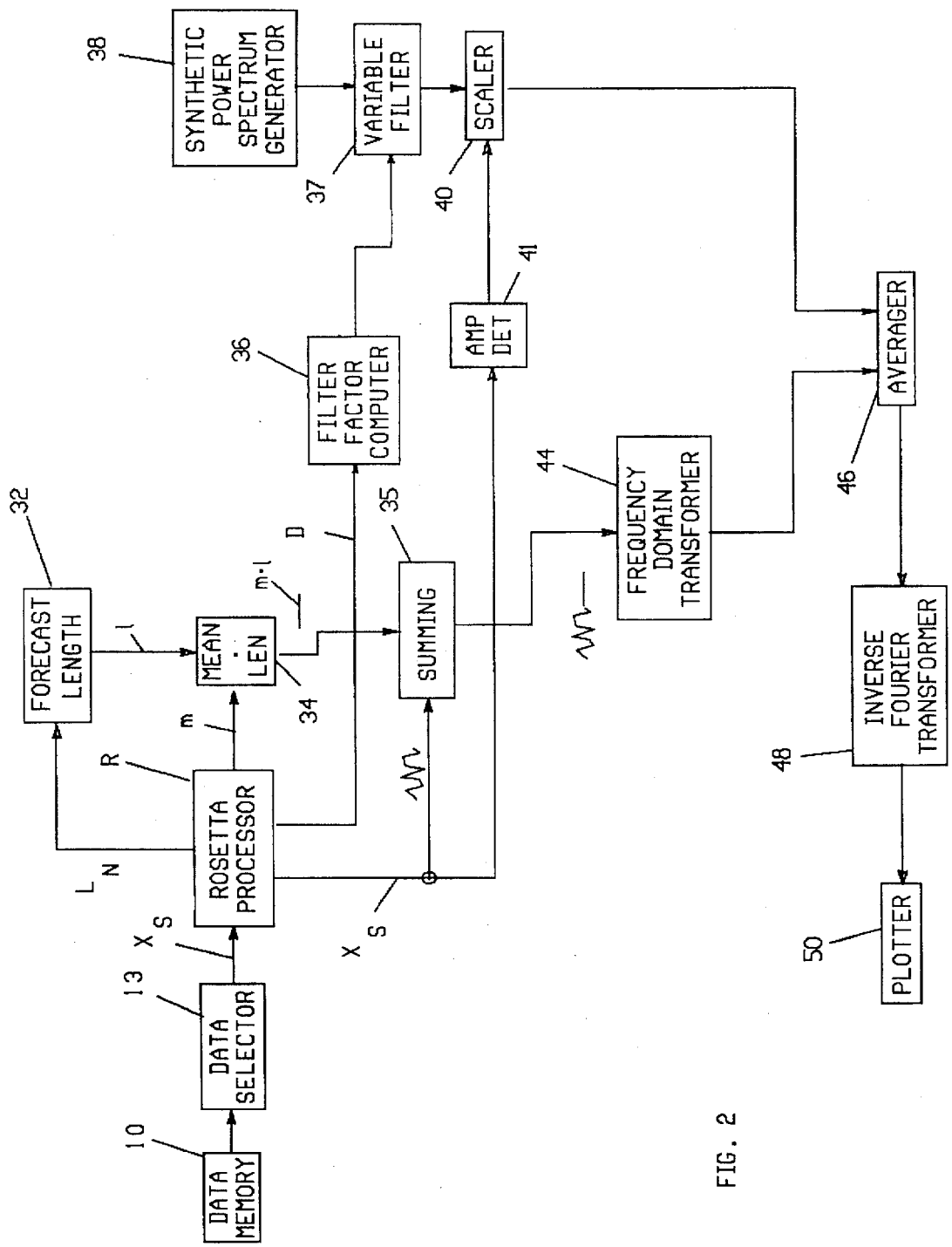
FIG. 2 is an electrical block diagram of a system for providing a forecast of future behavior of an activity based upon its historical image-derived behavior.

FIG. 2 illustrates a forecasting system particularly adapted for employing signals from the system illustrated in FIG. 1a, now termed a Rosetta processor, and wherein fractal dimensions may be determined conventionally (morphologically) as described with respect to FIG. 1a (entropically) or as illustrated with respect to FIG. 8.

The preprocessing would have been achieved and be available from Rosetta processor R shown in FIG. 2. In this instance, Rosetta processor R provides signals representative of a selected data sequence $X_S$, fractal dimension $D_F$ mean of data M, and signal sequence $X_L$. The data sequence $X_S$ is supplied to summing unit 35 and amplitude detector 41. The fractal dimension signal $D_F$ is supplied to filter factor computer 36. The data length period or window size of data $X_N$ is supplied to forecast period unit 32. The mean signal M is supplied to mean time extender unit 34.

Forecast period unit 32 determines and provides to mean X time extender 34 a selected forecast length (or number of data elements) period, which, as stated, may be selected as some function of sequence length L. Mean X length (ML) extender 34 provides as an output a signal indicative of the mean value m for a duration or length of l, it being provided to summing unit 35.

Summing unit 35 then concatenates the historical data signal $X_S$ with the m×l signal and then provides the combined signal output as shown to frequency domain transformer 44. The frequency domain output of transformer 44 is provided as one input to averager 46.

Synthetic power spectrum generator 38, employing, for example, a carbon resistor as a wideband random frequency source, provides a wideband random frequency output. This output is fed to variable frequency characteristic filter 37. Its actual filtering characteristic is controlled by an input to it from filter factor computer 36. Filter factor computer 36, responsive to a fractal dimension D or J (FIG. 8), computes a filter reactance designation for filter 37 which is a function of the fractal dimension, for example, of J (where the fractal dimension is obtained as per FIG. 8). Thus, computer 36 computes the desired frequency response characteristic F from the relationship $1/F^\beta$, where F is frequency, and $\beta=1-J$. The frequency characteristic would then be converted to a direct filter reactance in a known manner by computer 36 and thus provide an output to variable filter 37, enabling variable filter 37 to pass from generator 38 a selected frequency-amplitude selection from generator 38.

The output of filter 37 is fed through scaler 40, which controls its amplitude range. Scaler 40 is controlled in its range of passage by an amplitude control signal provided to scaler 40 by amplitude detector 41. Amplitude detector 41 is configured to set an amplitude passage range corresponding with the range of historical data signals $X_S$, as provided it by Rosetta processor R, as by proportional control.

The output of scaler 40 is then provided as a second input to average 46. Averager 46 then averages the two signals provided it, and the average output of averager 46 is supplied to inverse Fourier transformer 48, which transforms the average of the two, real based and synthetic signals, back to a time domain, and the result is plotted on plotter 50 wherein there is a plot of historical and forecast data which has been transformed as discussed and with respect to which the forecast portion is an excellent predictor of data activity for the forecast period.

Figure 3:
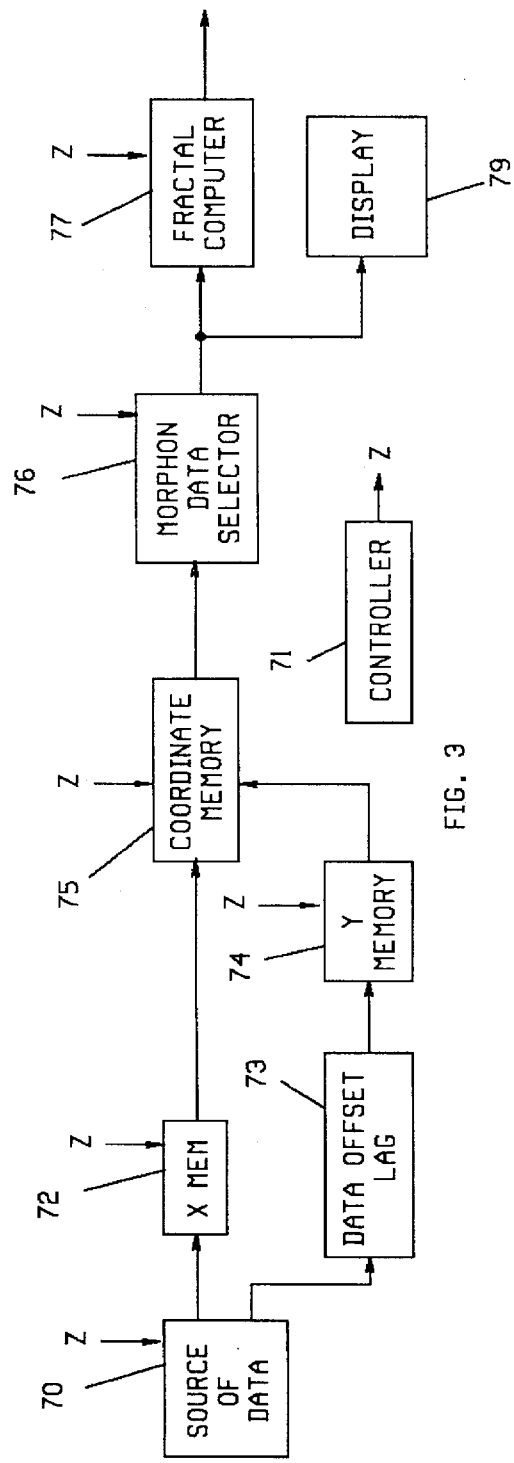
FIG. 3 is a block diagram of a system wherein offset sequences of the same data are employed to create X and Y data pieces as a basis for fractal dimensions.

FIG. 3 particularly illustrates a modified system for processing a sequence of data culminating in the determination of the fractal dimension for that data. It employs a morphon reordering of data in a fashion that important two-dimensional groupings are achieved and preserved.

(1) First, a sequence of data as, for example, that of curve L1, is available from source 70. For purposes of illustration, it will be assumed that a selected portion of this curve is to be considered, namely, the sequence labeled $P_1$–$P_5$, as illustrated in FIG. 1d. It is further assumed that they represent data amplitude values of: $P_1=1$, $P_2=3$, $P_3=6$, $P_4=5$, $P_5=7$. Controller 71, acting on source 70 and X memory 72, causes these points to be furnished and stored in X memory 72 in memory locations 1–5 corresponding with the data point designations.

(2) Controller 71 also acts on source 70 and provides this same sequence ($P_1$–$P_5$) through data offset or lag unit 73 to Y memory 74, unit 73 causing the data the be delayed by a factor determined from the first zero crossing of the historical data's auto-correlation or alternatively mutual information function. For illustrative purposes, we assume this value to be 1, wherein data points $P_5$, $P_1$, $P_2$, $P_3$, and $P_4$ are stored in this order in memory locations 1, 2, 3, 4, and 5, indicative of the delay.

(3) By comparing data point values stored in the indicated memory addresses, one would obtain a sequence of five points wherein, for example, $P_1$ has a value of X=1 and Y=3, $P_2$ has a value of X=3 and Y=6, $P_3$ has a value of X=6 and Y=5, $P_4$ has a value of X=5 and Y=7, and $P_5$ has a value of X=7 and Y=1. These pairs are stored, in this order, under the control of controller 71, in memory 75 in location C1–C5.

(4) A plot of these is termed a phase portrait or attractor of the data, because the historical data is plotted versus itself but with a phase shift or lag introduced into one of the data sequences.

(5) Next, controller 71 would effect the transfer of the sets from memory 75 to morphon data selector 76, which would transform the order of the five pairs arranged as C1–C5 in memory 75 into a new order wherein they would appear in accordance with the ascending value of the X coordinate. Thus, morphon data selector 76 would compare the X value of each data pair and assign an order number to that pair in accordance with its X value. Thus, the new order would be in terms of the C designated pairs C1, C2, C3, C4, and C5. Accordingly, the new order in essence connects the points and preserves the two-dimensional spatial correlation of the attractor. In other words, points that were clustered together in the picture of the attractor occur together in sequence in the new time series. This new data sequence is called a morphon, which means morphologically transformed and are displayed on display 79.

(6) The morphon data set, plottable data, may now be analyzed using classical fractal dimension algorithms to characterize space-phase information which heretofore was only possible using a single method called the dominant Liapunov exponent method as attributed to Wolf. Thus, under the control of controller 71, the curve of the transformed sequence C1–C5 is fed from selector 76 to fractal computer 77 which is configured to compute a fractal dimension or dimensions of the transformed curve, effecting the computation as discussed above with respect to box counting (of FIG. 1) or by the entropic system described in FIG. 8. Fractal dimension outputs are displayable on display 76. Controller 71 controls the operation of all steps as illustrated by its interconnections.

As a variant of the system described with respect to FIG. 3, applicant has determined a method for forecasting or predicting complicated behavior using fractals in the time domain. This variant system assumes the input data is chaotic. The user must ascertain this is in advance. The data is then converted into a morphon as described above by the completion of steps 1–5. The new data is then used as a closed loop data base of historically correlated values to search for future values.

In operation, a selected source of data is obtained from source 70, and there is produced a morphon using data selector 75 as described.

Next, take the current known value and search to obtain the sequence for closest match in terms of a selected tolerance.

Next, advance through a morphon sequence of as many intervals as desired by the user to obtain the morphon predicted value at that point.

Figure 5:
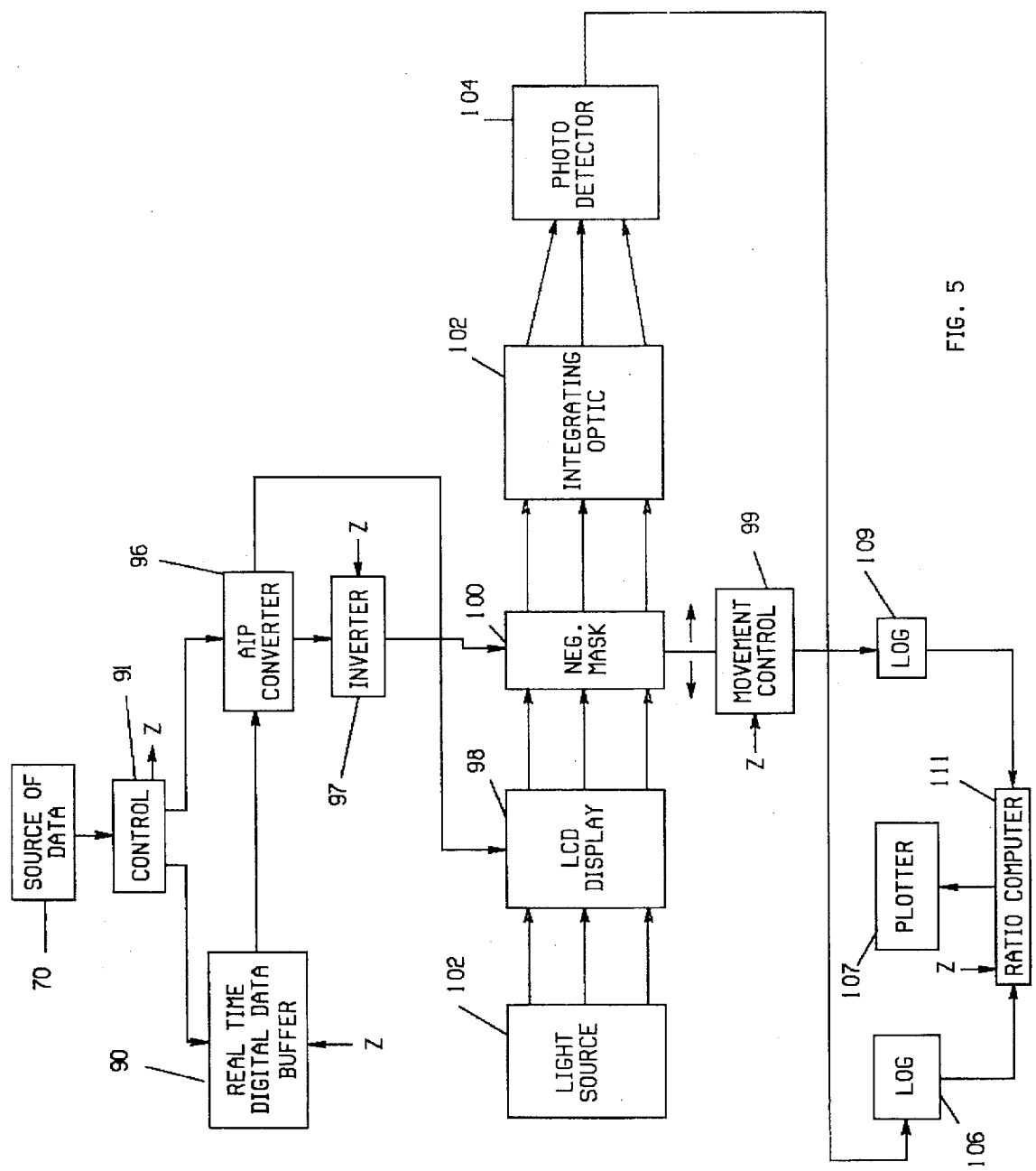
FIG. 5 is a block diagram of a system wherein data is first arranged as described with respect to FIG. 3 and from this arrangement is transformed into rectangular coordinate artificial insymmetration patterns (AIP), and fractal dimensions are generated employing optical processing.

Finally, by projecting forward an evenly spaced interval of time, the resulting output values may be used as the basis for selecting fiducial points, points of particular interest, for use with fractal interpolation in producing a synthetic data set for use with a system such as illustrated with respect to FIGS. 5 and 9.

Figure 4:
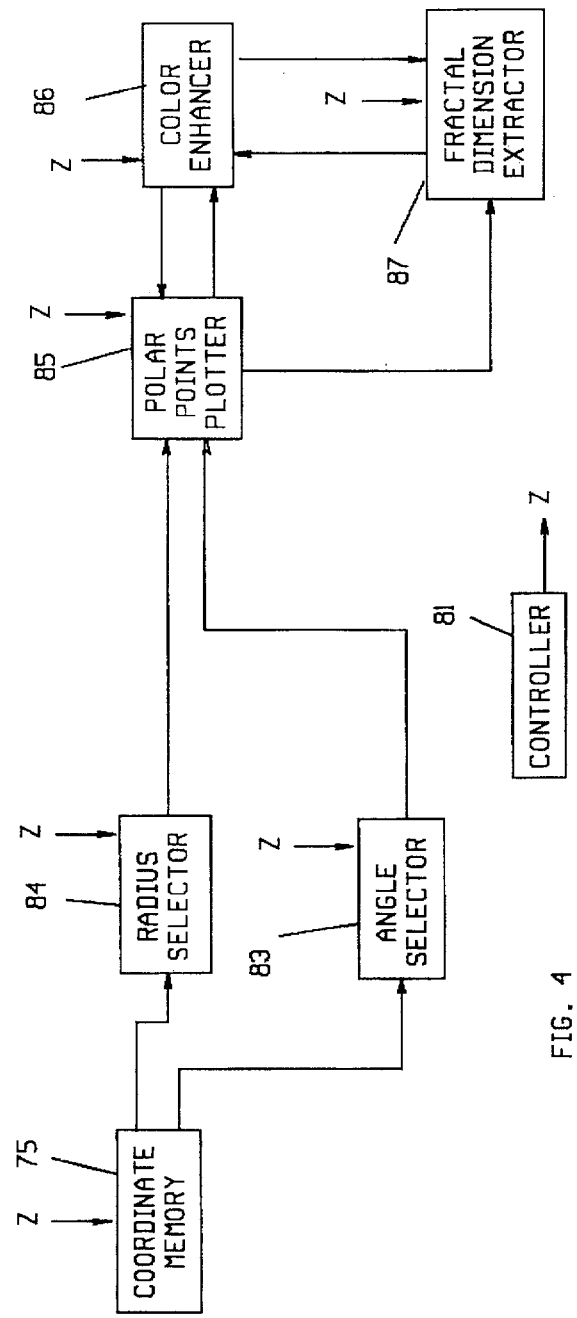
FIG. 4 is a block diagram of a system wherein fractal dimensions are determined employing a polar coordinate artificial insymmetration patterns (AIP) from data points arranged as described with respect to FIG. 3.

Referring now to FIG. 4, the system therein illustrated also effects a data lag, doing so in the creation of an artificial insymmetration pattern (AIP), this being a two-dimension image pattern produced from digital data which are encoded with the information of a time series in such a fashion that optical methods may be used to process the data and extract fractal dimensions as discussed with respect to FIG. 5 under the control of controller 81.

1–2. First, with reference back to FIG. 3, a sequence of digital data points are obtained from data source 70 and provided, as described to obtain the X-Y data, via a first column of data and a second column of data as lagged by one data point. The coordinates are then stored in coordinate memory 75 (FIGS. 3 and 4). It is to be noted that an expanded number of data points will be obtained beyond the five described.

Figure 4A:
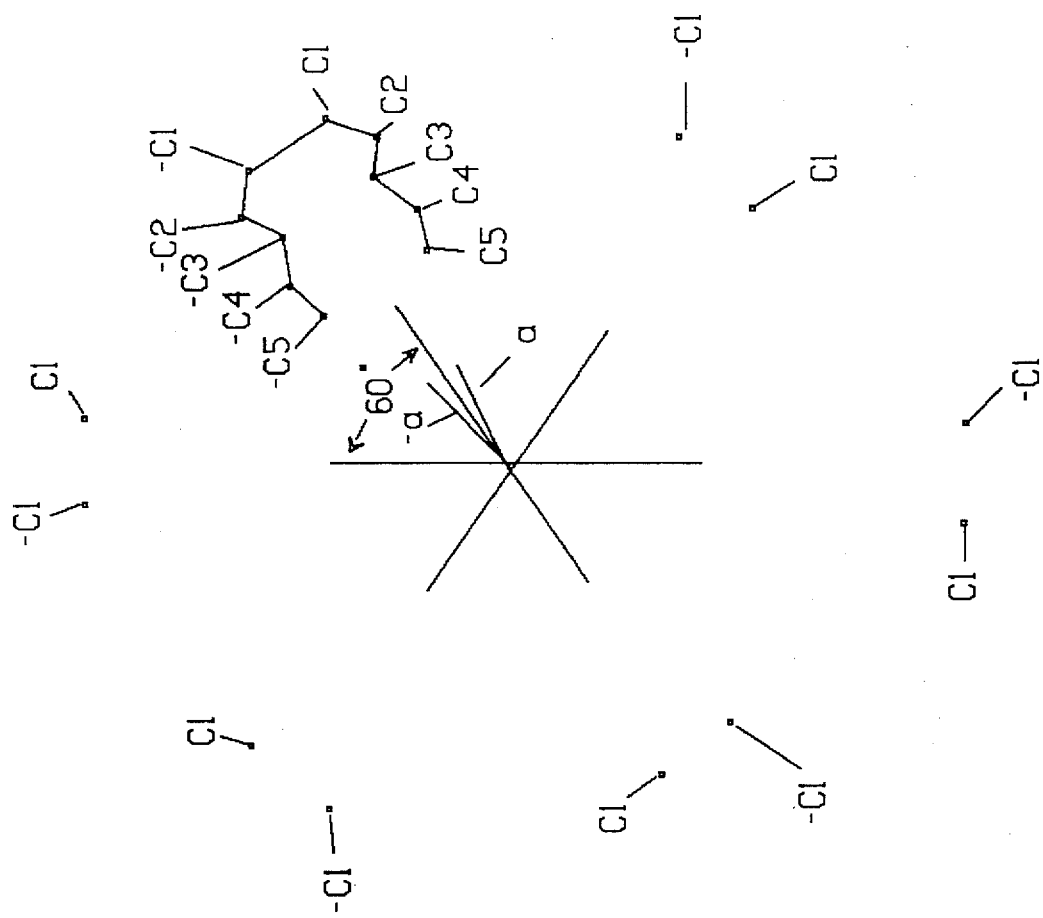
FIG. 4a is a schematic illustration illustrating a portion of the operation of the system illustrated in FIG. 4.

3. Then, one would select by selector 84 as a first column value representative of a radius r in a circular plot and as a second column value, a value representative of the angle $\theta$ for this plot. The angle may be in terms of radians or any other proportionality, and the plot is illustrated in FIG. 4a with respect to angular reference line a. The first data point is labeled $C_1$.

4. Next, create a conjugant point using the same radius with a $-\theta$, thereby plotting two points in polar space both derived from the same X-Y data pair.

Next, additional points would be plotted and designated by C2–C5. Thus, the points are designated C1–C5 and (–C1)–(–C5) and are derived as discussed above. However, the plotted values and points are arbitrary in the illustration.

5. Next, copy the two data points around the polar coordinate N times, where N is obtained as a user input which defines the number of times a specified angle increment can evenly divide the circle. For example, if 60° is selected, a 360° circle will be broken up into six arms or points on the circle, with each reference angular line referencing the original points. In practice, the optimal angle would be determined by examining the spread of the resulting image and maximizing this while enhancing the resulting spatial patterns.

6. The preceding step is repeated until all of the data has been plotted on plotter 85 in this fashion. Thus, there would be employed as many columns of values as there are data elements.

With all points interconnected (only +5 and –5 are shown), the result is a symmetrical snowflake-like pattern with symmetry artificially induced to enable optical processing to be done efficiently, with this being a requirement for simple Fourier optical processing and neural network inputs. Thus, processing may follow that illustrated in FIGS. 5–7.

The image may be further enhanced by introducing a color scheme to plotter 85 as from color enhancer 86, based on whether or not X is greater than Y, or by how much a difference in value exists between the two, etc. The AIP pattern may be used to extract the fractal dimension as, for example, by employing a Rosetta spectrum as described with respect to the system illustrated in FIG. 5. Also, rather than extracting the r, $\Theta$, and color from a single historical time series, these inputs may be treated as three variables driven by three different historical time series, thereby providing a basis for optical sensor or data fusion.

The steps recited above are effected via controller 81.

Instead of plotting data on a single LCD display, which is just black and white, one can plot as a color a third dimension. Thus, one can use a filter and analyze the pattern and color as a third dimension.

Referring now to FIG. 5, there is shown a system for sequentially processing in an air path an (AIP) Rosetta fractal spectrum using an optical processing approach.

Real-time analog data from data source 70 is converted to digital data and temporarily stored for essentially real-time processing in buffer 90. Under the control of logic controller 91, it is transferred by control 91 to AIP converter 96 where the data is transformed into two-dimensional X-Y data values and supplied to and plotted in and by LCD display 98. This process follows that described with respect to FIG. 3 wherein AIP coordinates are obtained employing lag shifting. The AIP converted data is also buffered by buffer 97 and supplied to a negative transform mask 100 which reverses the phase (light to dark, or vice versa) of a light gate. Mask 100 is movable by position control 99 (a conventional electromechanical control), and by such movement as controlled by control 91 effects the controlled variance in optical path length.

A source 102 of coherent or incoherent light illuminates LCD display 98, and by virtue of mask 100, there is effected a negative or positive (depending upon ultimate light measurements, as ultimately the slope of the information is the important thing) rendition of the LCD display to be projected onto integrating optics 102. Integrating optics 102 focuses its output onto a photodetector 104, and its responsive electrical output is applied to log converter unit 106 which takes the logarithm of the value of the output.

The movement or position of negative mask 100 is effected by movement control 99, as disclosed, and it also provides an output voltage representative of its position and movement, and this voltage is fed to log converter unit 109 which takes the logarithm of the voltage. The outputs of log units 106 and 109 are fed to ratio computer 111 which divides the output of log unit 106 by that of log unit 109. The resulting ratio output of computer 111 is fed to plotter 107, and plotter 107 presents a double logarithmic plot of the log of the photodetector voltage versus a log of the inverse distance factor effected on mask 100. The slope of this plot is a fractal dimension D.

Operation of the system is as follows.

(1) Real-time, or near real-time, digital data is provided to buffer 90.

(2) This data is converted to X-Y AIP coordinates by AIP converter 96.

(3) The AIP coordinates are plotted on LCD display 98.

(4) A copy of (3) is constructed on mask 100 to achieve an inverse light effect of the image.

(5) Light from light source 102 is passed through LCD display 98 and mask 100 to integrating optics 102 and focused onto photodetector 104. The net spill of light is projected thereon.

(6) A detected signal is converted to a discrete voltage or current value and fed to log unit 106 which takes the logarithm of it and supplies it as one input to ratio computer 111. At the same time, a position or movement signal is supplied to log unit 109 which takes the logarithm of it and supplies it as a second input to ratio computer 111. As described above, ratio computer 111 divides the output of log unit 106 by the output of log unit 109, the resulting ratio is fed to plotter 107 which plots the ratio value as a first point of a plot.

(7) Next, with the input signals from buffer 90 unchanged, that is, with no lag introduced by it as between the X-Y values, spacing between the initial image and the mask is increased incrementally by movement control 99. The light signal and movement signal are again registered and the ratio of their logarithms taken as described above.

(8) This process is continued through selected intervals of X-Y data and at a selected resolution as determined by the increments of movement of mask 100, thereby new points are supplied to plotter 107.

(9) The resulting data is plotted on plotter 107.

(10) A straight line is then fitted using regression methods, and the slope of this line is a global fractal dimension.

(11) The initial image is then reconstructed as a new AIP with lag incremented plus one as described with respect to FIG. 3.

(12) Steps 5–10 are repeated.

(13) The resulting series of fractal dimensions corresponds to that obtained by a first Rosetta partition as described with respect to FIGS. 1a and 1b.

(14) Upon completion of the initial image being lagged through all the data points, that is, one discrete lag for each data point of the data, as described with respect to FIG. 3, the mask is incremented by movement control 99 to the AIP corresponding to the AIP image plus one lag, and steps 5–10 are again repeated.

(15) Upon completion of all partitions, FIG. 1b of this process, if colored pixels are being used, as discussed with respect to FIG. 3, along with white light or a tunable monochromatic light source, steps 5–14 are repeated at each appropriate wavelength.

(16) The result is a spectrum of wavelengths and correlation dependent fractal values. Thus, an opto-mechanical implementation of the Rosetta processor is achieved.

Figure 6:
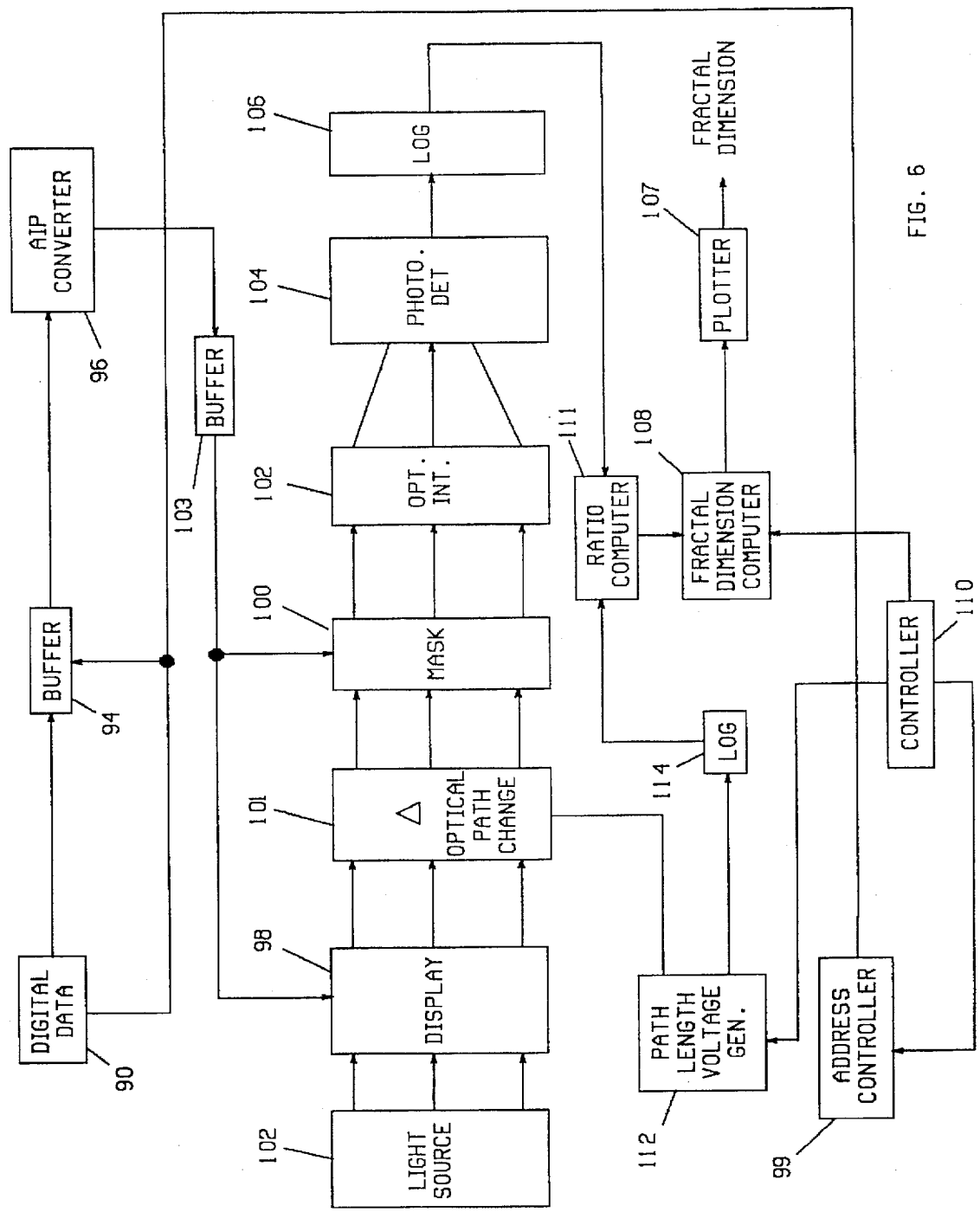
FIG. 6 is an electrical block diagram of an alternate system, in somewhat more detail, to that illustrated in FIG. 5.

FIG. 6 illustrates more specifically how a portion of the system illustrated by FIG. 5 may be implemented using discrete optical and electronic hardware.

Under the control of address controller 99, digital data from source 90, as also shown in FIG. 5, is fed to buffer memory 94, and from it is fed to AIP converter 96. The latter then converts the data to AIP coordinates, as previously described with respect to FIG. 3, after which it is fed to and displayed by LCD transparent display 98. Address controller 99 is in turn controlled by master controller 110.

A light source 102 is projected through display 98 and then through adjustable electro-optical path length delay 101. Then, the image data passes through mask 100 which, under the control of buffer 103, driven by AIP converter 96, reverses the phase of the light, creating a shadow of the original image. Finally, integrating optic 102 focuses elements of the shadowed light onto photodetector 104 which integrates the light into a summation value. Its output is fed to logarithmic converter unit 106 and a log output as fed as one input to ratio computer 111.

Path length delay 101 is an electrically controlled variable optical delay and is positioned in the image path, and it is of a type wherein it provides a variable delay for light passing through it as a function of voltage applied to it, in this instance, by path length signal generator 112. Thus, by its adjustment, a voltage is provided to optical path length delay 101 whereby a selected delay is provided to image passage as desired. This voltage is also taken as an indication of delay, or it is converted to a signal indication of delay, and the logarithm of this signal is taken by log unit 114 and is applied as a second input to ratio computer 111. Ratio computer 111 divides the log output of unit 106 by the log unit 114, and the resulting ratios, obtained as previously described with respect to FIG. 5, are supplied to fractal dimension computer 108. Computer 108 computes a slope which is equivalent to a fitted line being drawn through the same, plotted, ratio values. This slope is a fractal dimension, and it is displayed on plotter 107 as such. Again, the process follows that outline for FIG. 5.

By this arrangement, an electro-optical implementation enables an essentially real-time analysis utilizing optical lag techniques previously described, which is plotted on plotter 106.

Alternately, the light source and LCD transparent display may be replaced by an array of LED laser diodes addressed in the fashion such that each diode channel acts as a pixel, thereby allowing an active reconstruction of an image based on X-Y location addressing from AIP converter 96.

Figure 7:
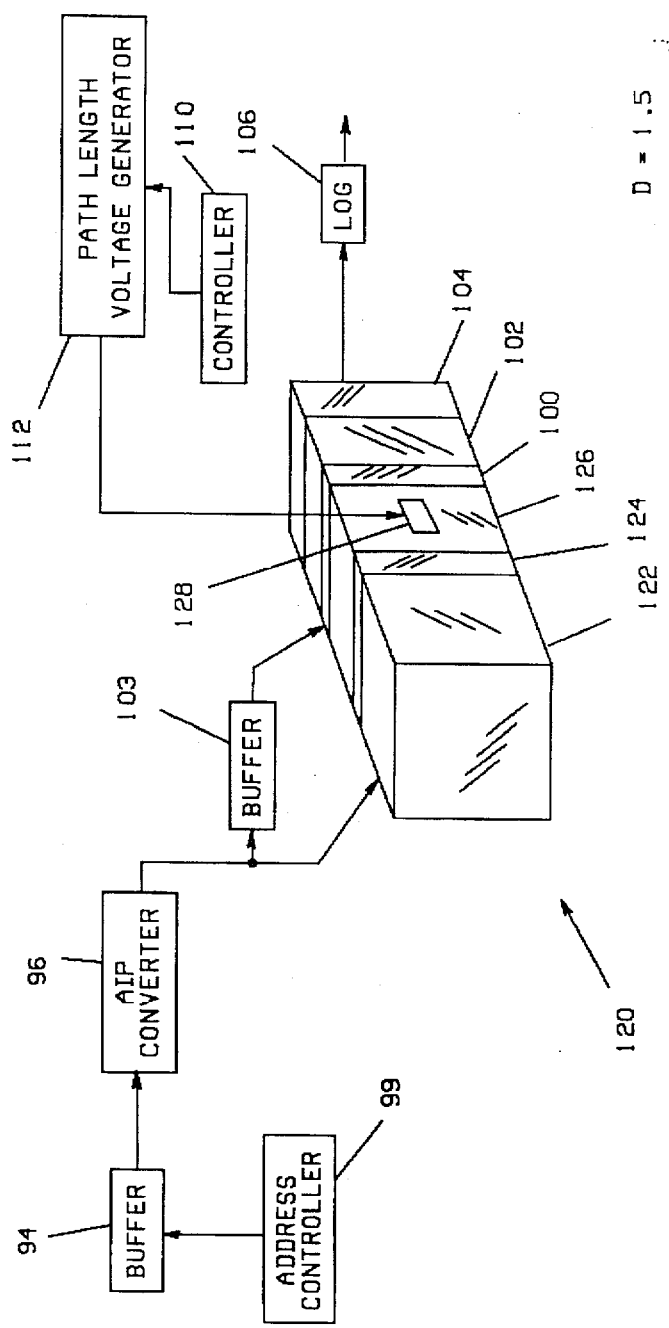
FIG. 7 is an electrical block diagram of a further modification of the system illustrated in FIGS. 5 and 6 and wherein an integrated system is largely embodied in a crystal structure or structures.

A further implementation of a portion of the system illustrated in FIGS. 5 and 6 is shown in FIG. 7. It employs a transparent crystal 120 which compactly enables the performance of several functions. At one end is an addressable array of LED laser diodes 122 or alternatively an incoherent photo-emitting polymer. These are driven by AIP converter 96, as fed data bits by buffer 94 from digital data source 90 (FIG. 6) under the control of address controller 99 as in the case of the system shown in FIG. 6. LED array 122 projects its display in the end 124 of active crystal structure 126. Active crystal structure 126 is one which, responsive to a voltage applied across it, as by oppositely positioned electrodes 128 (shown), changes its index of refraction and thereby its effective path length. As applied to crystal 126, it enables the introduction of a variable and controllable image signal delay.

Following the system illustrated in FIG. 6, electrodes 128, one on each opposite side, are selectively biased by path length voltage generator 112 under the control of process controller 99.

A mask 100, which may or may not be a portion of the crystal structure, is positioned at the output end of active crystal structure 126, it being controlled by buffer 103 as discussed above with respect to FIG. 6. Mask 100, of course, provides a reverse image of the image passing through from active crystal unit 126. As thus reversed, the image light is integrated by optic lens 102 which may be a portion of a second crystal or a gradient index lens (GRIN). Finally, the integrated output is projected onto photodetector 104 and its output is applied to log unit 106. Beyond this, the system is like and functions as described in FIGS. 5 and 6.

Considering the structural makeup of the system of FIG. 7, and with the fast operation of buffer 94 and buffer 103, it is believed that real-time processing is achievable.

FIG. 8 illustrates a further and most significant feature of the present invention. The system illustrated provides a simple and robust process in the provision of fractal dimensions and characterizations for any data sequence consisting of discrete real or integer numbers ranging in size from three points to any maximum dictated by available memory and storage considerations.

Referring to FIG. 8, through the control of system controller 141 a discrete sequence data of a given length is taken from data source 140, for example, being at least three value data points, and these three value data points, e.g., as shown in FIG. 1d, are stored in data point memory 142 and then fed, under the control of controller 141, to minimum-maximum detector 144, which determines the maximum value and minimum value of these three values and supplies these values to subtractor 146, which subtracts between the two high-low values found and supplies the difference, as the range R of data, to range memory 148.

Next, system controller 141 effects the transfer of the three data points from memory 142 to standard deviation calculator 150 which calculates from the three points a standard deviation s. Further, the number of data points being processed from memory 142 is counted by N detector 143 or by sequence length detector 25 of FIG. 1a, and N is supplied to fractal dimension calculator 152. Fractal dimension calculator 152 then calculates specifically determined fractal dimensions as J from the relationship $1/J$ if $J>\frac{1}{2}$ or $1/1-J$ if $J<\frac{1}{2}$, where J is found from:

$$\Re(J_{i+1}) = \frac{\log\left[\frac{R\left(\frac{1}{n}\right)}{sJ_i}\right]}{\log\left[\frac{1}{n}\right]}$$

where:

(1) The left-hand side of the equation designates real, as opposed to imaginary, quantities.

(2) R equals range.

(3) n is the number of data points processed.

(4) s is the standard deviation.

(5) J is the J coefficient from last computation. Where the computation is the first one, $J_i$ would be 1.0. The computation is iterated until a converged value resulting in a change of less than 0.0001 is obtained.

Following the computation of the first fractal dimension by calculator 152, data points would individually be added (e.g., 4 and then 5 as illustrated in FIG. 1d) to the sequence; and in each case, a new fractal dimension would be calculated by calculator 152, as described. This would continue until a selected sequence of the data of data source 140 had been processed. Alternately, the data to be processed from data source 140 would be subjected to the selection process discussed above with respect to FIG. 1a or otherwise selected as to data length. It is to be particularly kept in mind that the order of data from data source 140 need not be taken in the order recorded, since this method measures the entropy (or information) of the data sequence the values of the data rather than the positions in a sequence, were found by the applicant to be significant. It is to be noted that the output of computer 160 is labeled $JD_f$. Its relation to general fractal dimension term D is as follows:

$D=1/J$ if J is greater than $\frac{1}{2}$ $D=1/1-J$ if J is less than $\frac{1}{2}$ 0 is less than J and less than 1.

Finally, the applicant has found that not only is the system just described a robust one, and one which enables repetition of processing with the same anticipated accuracy of results, but one which has been proven much, much faster than other systems, particularly those referred to in the introduction of this application. Such as morphological methods.

FIG. 9 illustrates a system for producing multi-fractal interpolation. It allows all existing points to be used as a starting point. It then interpolates the user's specified number of points between the original values in such a fashion that the local fractal dimension may vary across the data set.

Figure 9A:
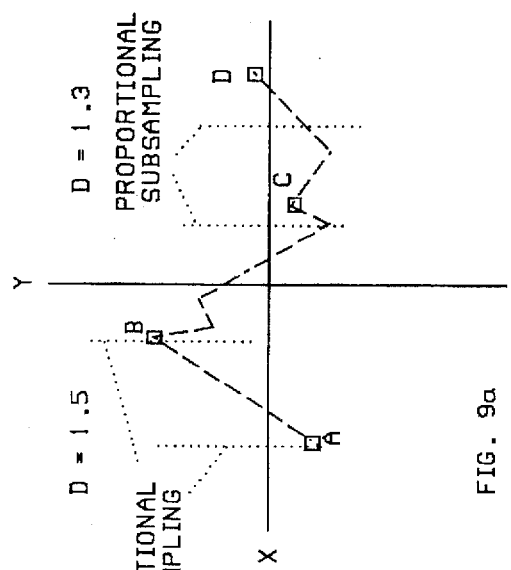
FIG. 9a is a graphical illustration relating to the system shown in FIG. 9.

It will be assumed that a data sequence $X_S$ is the subject of interpolation and is resident in data source 10. It is further assumed that it is desired to effect interpolation between each two successive points of this data sequence, and an example of these are illustrated in FIG. 9a. Thus, data points a, b, c, and d may be any four successive points within the whole data sequence $X_S$.

Significantly in the present system, fractal dimensions are obtained for both the total curve $X_S$ and portions or partitions of the total curve discretely in the region where, and with respect to, interpolation is to be effected.

As one example, illustrated in FIG. 9a, two adjoining partitions of the total sequence $X_S$ are labeled with different fractal dimensions, being D=1.5 and D=1.3. An overlapping one might register a fractal dimension of D=1.4. In this illustration, two of the data points, a and b, are within a D=1.5 area, and the other two, c and d, are in the D=1.3 area.

The term "J" as used with respect to FIG. 8 is also representative of fractal dimensions, being those obtained by fractal dimension computer 160 as described with respect to FIG. 8 and ideally employed with respect to the system of FIG. 9.

Referring to FIGS. 9 and 9a, we will assume that a fractal dimension for the entire sequence $X_S$ has been determined as being D=1.35. Thus, selector 170 provides the appropriate sequences or partitions to J processor 160, and the latter computes fractal dimensions of these as described above.

Data selector 170 provides selected data to both J (fractal dimension) processor 160 and data changer 174.

Data selector 170 supplies to data changer 174 the entire data sequence $X_S$. Data changer 174 is configured to enable a selected change of value of any selected data point of sequence $X_S$ and thereby provide a modified data sequence $X_S'$ which is then supplied as a second input to J processor 160 and, when values are settled on, as will be described, to scaler 180, which is adapted to adjustably reduce the dimensions of the curve $X_S'$. The output of scaler 180 is then fed to curve rotator 182, which is adapted to rotate or orient the modified and scaled data curve $X_S'$ to a desired orientation, which is then provided to plotter-interpolator 182. Both scaler 180 and rotator 182 perform data size and position manipulation in accordance with prior art technology.

In operation, we will assume that it is first desired to effect an interpolation in the form of a connecting curve between points a and b as shown in FIG. 9a. First, data selector 170 extracts the entire curve $X_S$ and supplies it to J processor 160, which in turn provides the fractal dimension of 1.45 of it to fractal dimension display 172 as a reference. At essentially the same time, data selector 170 provides the location of points a and b to plotter-interpolator 184 which are plotted as shown.

Data selector 170 also supplies to J processor 160 a discrete region of $X_S$ containing points a and b, and J processor 160 provides an output to display 172 wherein, as shown in FIG. 9a, it indicates a fractal dimension of 1.5.

Next, the entire sequence $X_S$ is furnished to data changer 174. It is configured to enable change of value of any points in the entire curve. In this instance, the pertinent points are data points a and b, and data changer 174 is operated to change the value of these points while providing the output of the amended whole curve $X_S'$ to J processor 160. Thus, J processor 160 provides new fractal dimensions to fractal dimension display 172, and thereby fractal dimensions are monitored while data changes to points a and b are made. These are made until fractal dimension display 172 registers a fractal dimension of 1.5, thus the fractal dimension corresponding to the local area of a curve involved. With this accomplished, the curve $X_S'$, providing the new fractal dimension, is fed to (via, if desired, an amended sequence memory) scaler 180 wherein appropriate scaling is effected, the curve being reduced to make its length equal to the length between points a and b. Thereafter, the scaled curve is supplied to curve rotator 182, which effects a rotation of the curve wherein $X_S'$ directly connects between points a and b on plotter-interpolator 184, and thereby interpolation is effected as shown. Thereafter, the other data points, for example, c and d and all others, would be interpolated in the same fashion. If it is desired to effect point interpolation, such as by the addition of single or multiple points between historical points, values for these may be taken off of the shrunken curve at proportional locations.

The plotting as described may be effected manually or may be computer controlled employing existing technology and based upon the known coordinate locations of all points and new points to which data is to connect. Thus, there is provided a precise mathematically determinable interpolation, this being in contrast to prior systems wherein the interconnecting interpolation data has had a random distribution of data values.

It is to be understood that the disclosure herein is instructive as to the programming of a general purpose computer wherein and whereby its circuits are configured in a particular way, and thus software may be employed to accomplish such a programming effect both in terms of the structure of a computer and methods performed on a computer.

From the foregoing, it is to be appreciated that the applicant has determined a new and improved system of both determining and employing fractal dimensions and wherein more perfect forecasting of data is made possible.

What is claimed is:

1. A data sequence generator comprising:

supply means for supplying, as a base data time sequence for forecasting, a plurality of data elements together representative of an activity;

selection means for selectively extracting from said supply means at least one discrete set of data of said base data sequence and providing said set as a selected output;

a fractal dimension calculator responsive to said selected output for providing a fractal dimension output;

data element generation means responsive to a said selected output and said fractal dimension output for providing additional data; and data sequence combining means responsive to a function of said base data sequence and said at least one additional data element for combining these and for providing a new sequence of data.

2. A data sequence generator as set forth in claim 1 wherein said additional data is outside of said base data sequence and thereby providing extrapolation.

3. A data sequence generator as set forth in claim 1 wherein said additional data is positioned between data of said base data sequence and thereby providing interpolation.

4. A sequence generator as set forth in claim 1 wherein said set of said base data sequence comprises a discrete division of said base data sequence.

5. A data sequence generator as set forth in claim 1 wherein said set comprises a plurality of subsets, and said subsets are provided as said selected output.

6. A data sequence generator as set forth in claim 5 wherein at least one of said subsets, a first subset, includes a plurality of data elements in at least one other, a second, said subset.

7. A data sequence generator as set forth in claim 6 wherein data elements of said first subset are substantially the same as data elements in said second subset, but vary in order as between subsets, wherein there is a selected lag as between like ordered data elements of said first and second subsets.

8. A data sequence generator as set forth in claim 7 wherein said selection means includes coordinate arrangement means for pairing each data element from said first subset with a data element from said second subset to define a data pair combination representative of artificial insymmetration.

9. A data sequence generator as set forth in claim 8 wherein said pair of data elements from said pairing comprises X-Y coordinates.

10. A data sequence generator as set forth in claim 8 wherein said selection means provides a plurality of 3-N pairs of said subsets, the data elements of each said pair being progressively offset with an additional said data lag to define a plurality of image patterns.

11. A data sequence generator as set forth in claim 8 wherein each data pair employs as one subset the same subset.

12. A data sequence generator as set forth in claim 10 wherein said fractal dimension calculator comprises:

optical means responsive to said X-Y combination for projecting a light image pattern of each said image pattern;

light image responsive means responsive to receipt of a projected said image pattern for providing an electrical output;

path length delay means responsive to a control input for effecting delays, lags, of a light image between projections and receipt of a light image pattern;

control means responsive to electrical outputs of said electrical output responsive to the projection of successive ordered light image patterns for controlling said path length delay to effect a delay wherein successive ordered light image patterns provide the same said electrical output from said image responsive means;

delay indication means for providing a delay signal output which is a function of each said effected delay;

signal means coupled to said selection means, said optical means, said delay means, and said delay indication means for effecting the projection of said optical means of a plurality of said image patterns and for the provision of a series of sets of a combination of a said electrical output (A) and a said delay signal output (B); and computation means responsive to each said set of electrical output (A) and delay signal output (B) for providing the ratio of the logarithms of (A) with respect to (B) and for computing the approximate slope of plotted said ratios.

13. A data sequence generator as set forth in claim 7 wherein said lag is one.

14. A data sequence generator as set forth in claim 7 wherein:
said selection means includes means for providing a signal representative of a vector as a function of the value of said first subset and for providing a signal representative of an angle which is a function of a like ordered data element of said second subset; and
image means for providing a plurality of plotted points wherein a plotted point is a function of said length of said vector and a said angle, and from said plurality there is formed an image.

15. A data sequence generator as set forth in claim 5 wherein a said set comprises a sequence of data extending in the reverse direction to that of the order of said base data sequence.

16. A data sequence generator as set forth in claim 1 wherein said fractal dimension calculator includes:
range means responsive to said selection means for providing the difference between minimum and maximum values of data elements of said discrete set of said data elements and providing a range R output;
sequence length detection means responsive to said selection means for providing the number of elements of a said discrete set of data elements as a signal length N output;
standard deviation detection means responsive to said selection means for providing the standard deviation of data elements of a said set as an s output; and
computation means responsive to said R, N, and S outputs for computing a fractal dimension.

17. A data sequence generator as set forth in claim 16 wherein a said set comprises a sequence of data extending in the reverse direction to that of the order of said base data sequence.

18. A data sequence generator as set forth in claim 16 wherein said computation means comprises:

$$\Re(J_{i+1}) = \frac{\log\left[\frac{R\left(\frac{1}{n}\right)}{sJ_i}\right]}{\log\left[\frac{1}{n}\right]}$$

where J is the J coefficient for the last computation, and where the coefficient is the first one, J would be 1.0, and $\Re$ designates real as opposed to imaginary values.

19. A data sequence generator as set forth in claim 18 wherein said set comprises a sequence of data extending in the reverse order to that of the order of said base data sequence.

20. A data sequence generator as set forth in claim 3 wherein said additional data is a function of said base data sequence as modified to effect a fractal dimension derived from the area of said base data sequence wherein said additional data is positioned.

21. A data sequence generator as set forth in claim 5 wherein:
said selection means sequentially provides a series of said subsets of said set of data as said selected output;
said fractal dimension calculator provides a like said series of fractal dimension outputs from said subsets;
said data sequence generator further provides:
slope comparison means responsive to said series of fractal dimension outputs for providing a slope detection signal when the slope of said series of fractal dimensions is on the order of zero; and
fractal dimension detection means responsive to the occurrence of a slope detection signal and said fractal dimension output for providing the value of fractal dimension provided it is within the approximately range of from 1.49 to 1.51.

22. A data sequence generator as set forth in claim 21 wherein a said subset comprises a sequence of data extending in the reverse direction to that of the order of said base data sequence.

23. A data sequence generator as set forth in claim 2 wherein said data element generation means comprises means responsive to said set of data from said selection means and said fractal dimension output for providing said at least one additional data element.

24. A data sequence generator as set forth in claim 23 wherein said data element generation means includes synthetic power spectrum generating means and is responsive to a frequency characteristic function of said fractal dimension output for controlling the spectrum of said synthetic power generation means for providing said at least one additional data element.

25. A data sequence generator as set forth in claim 24 wherein said base data sequence plus said at least one additional data element includes said base data sequence as extended for a selected length by the mean of said base data sequence and is provided as a new data sequence.

26. A data sequence generator as set forth in claim 25 wherein said output of said synthetic power spectrum generator is a function of the amplitude of said base data sequence.

27. A data sequence generator as set forth in claim 26 wherein said selected length is a function of the length of said base data sequence.

28. A data sequence generator as set forth in claim 27 wherein said selected length is the approximate length of said base data sequence wherein said new data sequence is thus an extrapolated data sequence for approximately twice the length of said base sequence.

29. A data sequence generator as set forth in claim 3 wherein said additional data is a function of said base data sequence as modified to yield a fractal dimension of a region proximate to a said set of data.

30. A data sequence generator as set forth in claim 1 wherein said fractal dimension calculator comprises an electro-optical assembly.

31. A data sequence generator as set forth in claim 1 wherein said fractal dimension calculator comprises an optical crystal assembly.

32. A data sequence generator as set forth in claim 1 wherein said fractal dimension calculator comprises an opto-mechanical assembly.

* * * * *